(12) United States Patent
Muharemovic et al.

(10) Patent No.: US 8,571,120 B2
(45) Date of Patent: Oct. 29, 2013

(54) TRANSMISSION OF ACKNOWLEDGE/NOT ACKNOWLEDGE (ACK/NACK) BITS AND THEIR EMBEDDING IN THE REFERENCE SIGNAL

(75) Inventors: Tarik Muharemovic, Dallas, TX (US); Zukang Shen, Richardson, TX (US); Pierre Bertrand, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 698 days.

(21) Appl. No.: 11/858,891

(22) Filed: Sep. 20, 2007

(65) Prior Publication Data

US 2008/0075184 A1    Mar. 27, 2008

Related U.S. Application Data

(60) Provisional application No. 60/826,686, filed on Sep. 22, 2006.

(51) Int. Cl.
*H04K 1/10* (2006.01)

(52) U.S. Cl.
USPC ............................................. 375/260

(58) Field of Classification Search
USPC ............................................. 375/260
See application file for complete search history.

(56) References Cited

U.S. PATENT DOCUMENTS

| | | | |
|---|---|---|---|
| 2002/0126763 A1* | 9/2002 | Jeong et al. | 375/295 |
| 2004/0179625 A1 | 9/2004 | Kim | |
| 2004/0202147 A1 | 10/2004 | Hakkinen et al. | |
| 2005/0111522 A1 | 5/2005 | Sung et al. | |
| 2006/0056528 A1 | 3/2006 | Jung et al. | |
| 2006/0067381 A1* | 3/2006 | Chakravarthy et al. | 375/130 |
| 2007/0291696 A1* | 12/2007 | Zhang et al. | 370/331 |

FOREIGN PATENT DOCUMENTS

EP    1 189 380 A2    3/2002

OTHER PUBLICATIONS

Samsung, "R1-061697: Dl ACK/NACK signaling," 3GPP Jun. 27, 2006, 5 pages.*
Texas Instruments, "R1-061811: Uplink Reference Signal Design and Multiplexing for Both CQI and Channel Estimation," 3GPP Jun. 27, 2006, 14 pages.*
Huawei, "R1-061819: Overhead reduction of UL CQI signalling for E-UTRA DL," 3GPP Jun. 27, 2006, 9 pages.*
Huawei, "R1-061820: Baseline uplink CQI message—content and sizeL," 3GPP Jun. 27, 2006, 4 pages.*

(Continued)

*Primary Examiner* — Juan A Torres
(74) *Attorney, Agent, or Firm* — Mima Abyad; W. James Brady; Frederick J. Telecky, Jr.

(57) ABSTRACT

Transmitting a acknowledge/not acknowledge (ACK/NACK) response in a wireless cellular network by mapping the data value into a cyclic shifted version of a reference signal. A subframe is formed with a plurality of symbols with certain symbols designated as reference signal (RS) symbols. The receiver and transmitter both know when an ACK/NACK response is expected. If an ACK/NACK response is not expected, then an RS is inserted in the duration of symbols designated as RS symbols. If an ACK/NACK response is expected, then the ACK/NACK response is embedded in one or more of the symbols designated as RS symbols. The subframe is transmitted to a receiver, and the receiver can determine the ACK/NACK value in the RS symbol, if present, and also use the RS symbol for coherent demodulation of a CQI (channel quality indicator) or data.

14 Claims, 6 Drawing Sheets

(56) References Cited

OTHER PUBLICATIONS

Motorola, "R1-061730: Segmentation and ACK/NACK Signaling for LTE," 3GPP Jun. 27, 2006, 10 pages.*
LG, "R1-061777: DCT based CQI reporting scheme," 3GPP Jun. 27, 2006, 11 pages.*
Mitsubishi Electric, "R1-061815: Comparison of CQI feedback schemes and a number of control bits," 3GPP Jun. 27, 2006, 11 pages.*
Multiplexing and Link Analysis of CQI Channel in UL, Qualcomm Europe, Cannes, France, Jun. 2006.
Uplink Non-data-associated Control Signaling, Ericsson, Cannes, France, Jun. 2006.
Overhead Analysis and Resource Assignment for Uplink CQI Feedback Channel and TP, Motorola, Cannes, France, Jun. 2006.
Uplink ACK/NACK Signaling: FDM vs. TDM, Samsung, Cannes, France, Jun. 2006.
Data-non-associated L1/L2 Control Channel Structure for E-UTRA uplink, NTT DoCoMo, Sharp, Toshiba Corporation, Cannes, France, Jun. 2006.
Control of CQI Feedback Signaling in E-Utra, Philips, Intel, Cannes, France, Jun. 2006.

* cited by examiner

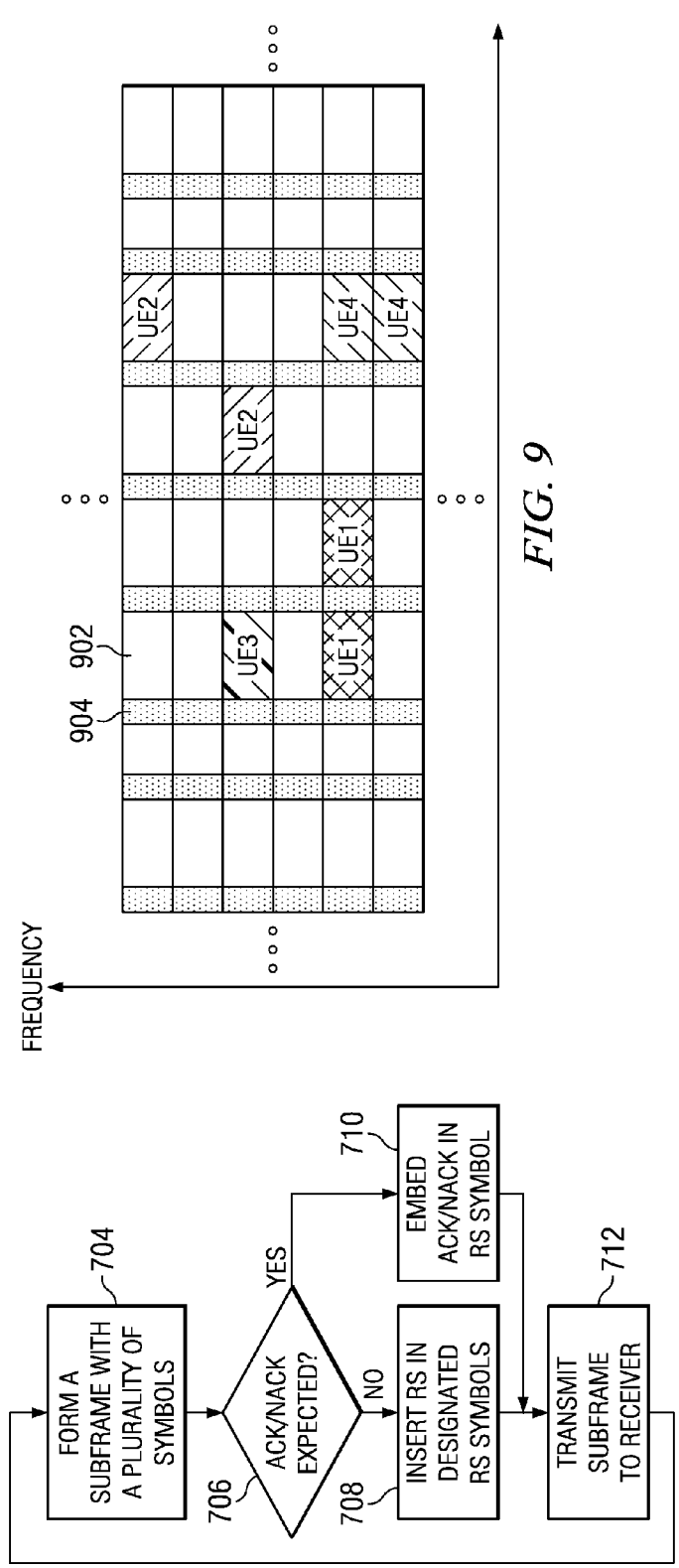
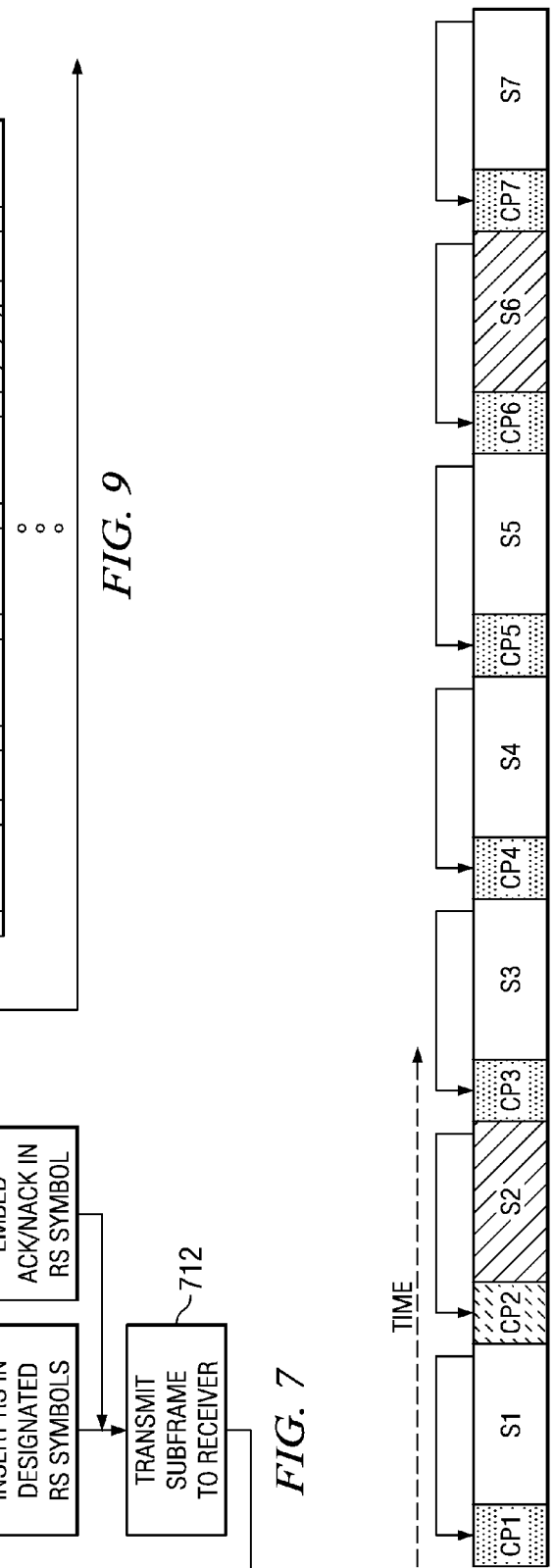
FIG. 7
FIG. 8
FIG. 9

TRANSMISSION OF ACKNOWLEDGE/NOT ACKNOWLEDGE (ACK/NACK) BITS AND THEIR EMBEDDING IN THE REFERENCE SIGNAL

CLAIM OF PRIORITY

This application for Patent claims priority to U.S. Provisional Application No. 60/826,686 entitled "Transmission of ACK/NACK Bits Using CAZAC Sequences" filed Sep. 22, 2006, incorporated by reference herein.

FIELD OF THE INVENTION

Embodiments of this invention generally relate to wireless communication, and in particular to reference signals for single carrier orthogonal frequency division multiple access (SC-FDMA) systems.

BACKGROUND OF THE INVENTION

The Global System for Mobile Communications (GSM: originally from Groupe Spécial Mobile) is currently the most popular standard for mobile phones in the world and is referred to as a 2G (second generation) system. Universal Mobile Telecommunications System (UMTS) is one of the third-generation (3G) mobile phone technologies. Currently, the most common form uses W-CDMA (Wideband Code Division Multiple Access) as the underlying air interface. W-CDMA is the higher speed transmission protocol designed as a replacement for the aging 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the older TDMA (Time Division Multiple Access) signaling method of GSM networks.

Orthogonal Frequency Division Multiple Access (OFDMA) is a multi-user version of the popular Orthogonal Frequency-Division Multiplexing (OFDM) digital modulation scheme. Multiple access is achieved in OFDMA by assigning subsets of sub-carriers to individual users. This allows simultaneous low data rate transmission from several users. Based on feedback information about the channel conditions, adaptive user-to-sub-carrier assignment can be achieved. If the assignment is done sufficiently fast, this further improves the OFDM robustness to fast fading and narrow-band co-channel interference, and makes it possible to achieve even better system spectral efficiency. Different number of sub-carriers can be assigned to different users, in view to support differentiated Quality of Service (QoS), i.e. to control the data rate and error probability individually for each user. OFDMA is used in the mobility mode of IEEE 802.16 WirelessMAN Air Interface standard, commonly referred to as WiMAX. OFDMA is currently a working assumption in 3GPP Long Term Evolution (LTE) downlink. Also, OFDMA is the candidate access method for the IEEE 802.22 "Wireless Regional Area Networks".

NodeB is a term used in UMTS to denote the BTS (base transceiver station). In contrast with GSM base stations, NodeB uses WCDMA or OFDMA as air transport technology, depending on the type of network. As in all cellular systems, such as UMTS and GSM, NodeB contains radio frequency transmitter(s) and the receiver(s) used to communicate directly with the mobiles, which move freely around it. In this type of cellular networks the mobiles cannot communicate directly with each other but have to communicate with the BTSs Traditionally, the NodeBs have minimum functionality, and are controlled by an RNC (Radio Network Controller). However, this is changing with the emergence of High Speed Downlink Packet Access (HSDPA), where some logic (e.g. retransmission) is handled on the NodeB for lower response times and in 3GPP LTE (a.k.a. E-UTRA—Evolved Universal Terrestrial Radio Access Network) almost all the RNC functionalities have moved to the NodeB.

The utilization of cellular technologies allows cells belonging to the same or different NodeBs and even controlled by different RNC to overlap and still use the same frequency. The effect is sometimes utilized in soft handovers.

Since WCDMA and OFDMA often operates at higher frequencies than GSM, the cell range is considerably smaller compared to GSM cells, and, unlike in GSM, the cells' size is not constant (a phenomenon known as "cell breathing"). This requires a larger number of NodeBs and careful planning in 3G (UMTS) networks. Power requirements on NodeBs and UE (user equipment) are much lower.

A NodeB can serve several cells, also called sectors, depending on the configuration and type of antenna. Common configuration include omni cell (360°), 3 sectors (3×120°) or 6 sectors (3 sectors 120° wide overlapping with 3 sectors of different frequency).

High-Speed Packet Access (HSPA) is a collection of mobile telephony protocols that extend and improve the performance of existing UMTS protocols. Two standards HSDPA and HSUPA have been established. High Speed Uplink Packet Access (HSUPA) is a packet-based data service of Universal Mobile Telecommunication Services (UMTS) with typical data transmission capacity of a few megabits per second, thus enabling the use of symmetric high-speed data services, such as video conferencing, between user equipment and a network infrastructure.

An uplink data transfer mechanism in the HSUPA is provided by physical HSUPA channels, such as an Enhanced Dedicated Physical Data Channel (E-DPDCH), implemented on top of the uplink physical data channels such as a Dedicated Physical Control Channel (DPCCH) and a Dedicated Physical Data Channel (DPDCH), thus sharing radio resources, such as power resources, with the uplink physical data channels. The sharing of the radio resources results in inflexibility in radio resource allocation to the physical HSUPA channels and the physical data channels.

The signals from different users within the same cell may interfere with one another. This type of interference is known as the intra-cell interference. In addition, the base station also receives the interference from the users transmitting in neighboring cells. This is known as the inter-cell interference When an orthogonal multiple access scheme such as Single-Carrier Frequency Division Multiple Access (SC-FDMA)—which includes interleaved and localized Frequency Division Multiple Access (FDMA) or Orthogonal Frequency Division Multiple Access (OFDMA)—is used; intra-cell multi-user interference is not present. This is the case for the next generation UMTS enhanced-UTRA (E-UTRA) system—which employs SC-FDMA—as well as IEEE 802.16e also known as Worldwide Interoperability for Microwave Access (WiMAX)—which employs OFDMA, In this case, the fluctuation in the total interference only comes from inter-cell interference and thermal noise which tends to be slower. While fast power control can be utilized, it can be argued that its advantage is minimal.

In the uplink (UL) of OFDMA frequency division multiple access (both classic OFDMA and SC-FDMA) communication systems, it is beneficial to provide orthogonal reference signals (RS), also known as pilot signals, to enable accurate channel estimation and channel quality indicator (CQI) estimation enabling UL channel dependent scheduling, and to enable possible additional features which require channel sounding.

Channel dependent scheduling is widely known to improve throughput and spectral efficiency in a network by having the NodeB, also referred to as base station, assign an appropriate modulation and coding scheme for communications from and to a user equipment (UE), also referred to as mobile, depending on channel conditions such as the received signal-to-interference and noise ratio (SINR). In addition to channel dependent time domain scheduling, channel dependent frequency domain scheduling has been shown to provide substantial gains over purely distributed or randomly localized (frequency hopped) scheduling in OFDMA-based systems. To enable channel dependent scheduling, a corresponding CQI measurement should be provided over the bandwidth of interest. This CQI measurement may also be used for link adaptation, interference co-ordination, handover, etc.

One method for forming reference signals is described in US patent application 20070171995, filed Jul. 26, 2007 and entitled "Method and Apparatus for Increasing the Number of Orthogonal Signals Using Block Spreading" and is incorporated by reference herein. The generation of reference signals (RS) sequences can be based on the constant amplitude zero cyclic auto-correlation (CAZAC) sequences, and the use of block spreading for multiplexing RS from multiple UE transmitters is described therein.

Several control signaling information bits on downlink transmission need to be transmitted in uplink, as described in 3GPP TR 25.814 v7.0.0. 3rd Generation Partnership Project; Technical Specification Group Radio Access Network; Physical layer aspects for evolved Universal Terrestrial Radio Access (UTRA). For example, downlink hybrid Automatic Repeat reQest (ARQ) (HARQ) requires a 1-bit ACK/NACK in uplink for each received downlink transport block. Further, the downlink channel quality indicator (CQI) needs to be feedback in the uplink to support frequency selective scheduling in the downlink. When a UE (user equipment) has uplink data transmission, the downlink ACK/NACK and/or CQI can be transmitted along with the uplink data, in which the uplink reference signal can be used for coherent demodulation of the uplink data, as well as the downlink ACK/NACK and/or CQI. In case there is no uplink data transmission, a reference signal can be transmitted for coherent demodulation of the downlink ACK/NACK and/or CQI. Thus, multiple dedicated time-frequency resource blocks are necessary for the reference signal and the ACK/NACK and/or CQI. While CQI may be transmitted less frequently based on a periodic or trigged mechanism, ACK/NACK needs to be transmitted in a timely manner for every received downlink transport block to support HARQ. Note that ACK/NACK is sometimes denoted as ACKNAK or just simply ACK, or any other equivalent term.

SUMMARY OF THE INVENTION

An embodiment of the present invention provides ACK/NACK response by embedding it in the reference signal. Preferred embodiment of the present invention provides for transmitting ACK/NACK response in a wireless cellular network by mapping the ACK/NACK value into a cyclic shifted version of a reference signal. A subframe is formed with a plurality of symbols with certain symbols designated as reference signal (RS) symbols. The receiver and transmitter both know when an ACK/NACK response is expected. If an ACK/NACK response is not expected, then an RS is inserted in the duration of symbols designated as RS symbols. If an ACK/NACK response is expected, then the ACK/NACK response is embedded in one or more of the symbols designated as RS symbols. The subframe is transmitted to a receiver, and the receiver can determine the ACK/NACK value in the RS symbol, if present, and also use the RS symbol for coherent demodulation of a CQI (channel quality indicator) or data.

BRIEF DESCRIPTION OF THE DRAWINGS

Particular embodiments in accordance with the invention will now be described, by way of example only, and with reference to the accompanying drawings:

FIG. 7 is a flow chart illustrating formation of a subframe that uses embedding of ACK/NACK bits within a reference signal;

FIG. 8 shows an exemplary sub-frame structure that includes reference signals according to an embodiment of the present invention;

FIG. 9 is a plot illustrating a representative time-frequency resource assignment for ACK/NACK transmission of multiple UEs, in accordance with one embodiment of the invention;

DETAILED DESCRIPTION OF EMBODIMENTS OF THE INVENTION

Figure 1:
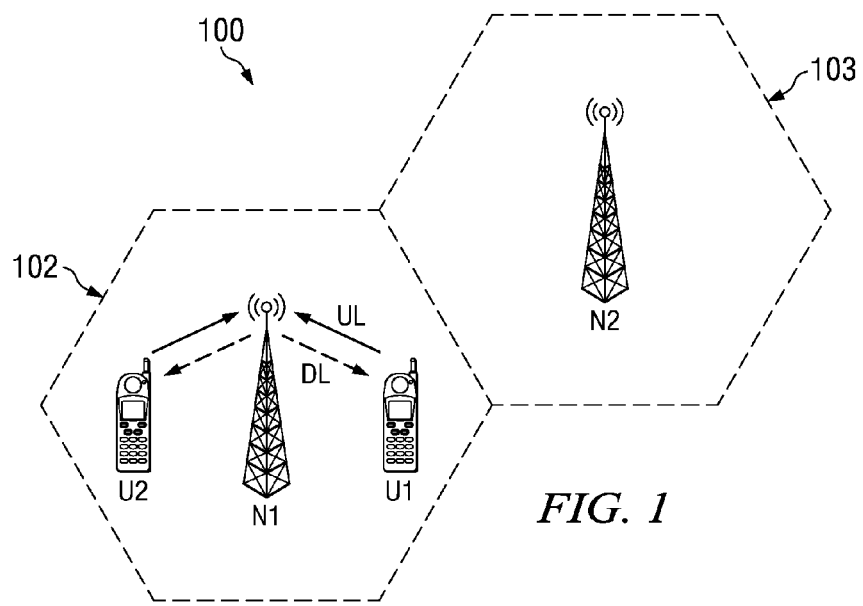
FIG. 1 is a representation of two cells in a cellular communication network that includes an embodiment of a cyclic shifted CAZAC sequence for transmitting ACK/NACK bits.

FIG. 1 is a representation of two cells in a cellular communication network 100. In this representation only two cells 102-103 are illustrated for simplicity, but it should be understood that the network includes a large matrix of cells and each cell is generally completely surrounded by neighboring cells. A representative set of user equipment U1-U2 is currently in cell 102 and is being served by NodeB N1. Cell 103 is a neighbor cell and NodeB N2 is not serving UE U1-U2. U1 and U2 are representative of a set of user equipment in any given cell since there will typically be tens or hundreds of UE in each cell. Each UE communicates with its serving NodeB using an uplink transmission UL and a downlink transmission DL.

Cyclic-shift keying (CSK) is a transmit strategy where certain information is encoded inside a cyclic shift of a pre-defined base signal. The pre-defined base signal is known at both the transmitter and the receiver a-priori. CSK transmission can be decoded in a "non-coherent" manner, even when the reference signal is not present. Embodiments of the invention use cyclic shift keying (CSK) to transmit information (data and/or control information) in OFDM-based systems. In certain embodiments, CSK is applied to the time-domain signal, whereas the frequency-domain transmission is flat across a spectrum of tones. By flat, we mean that the frequency-domain transmission of the pre-defined base signal has a constant magnitude. Thus, the frequency transform of the pre-defined base signal has a constant magnitude across a certain frequency band. Since the frequency-spectrum of the pre-defined base signal is flat in magnitude (across some band), this means that time-domain cyclic shifts of the pre-defined base signal are nearly-orthogonal. Thus, separability (at the receiver) between different cyclic shifts of the pre-defined base signal is obtained.

OFDM-based modulation is very convenient for ensuring that the spectrum of the transmitted signal is flat across a band. The pre-defined base signal can be obtained simply by selecting a constant-magnitude (aka constant-amplitude) sequence, and transmitting it across a set of tones. Cyclic shifts of the pre-defined base signal are performed in the time-domain, and the information is encoded inside the value of the cyclic shift.

Figure 2:
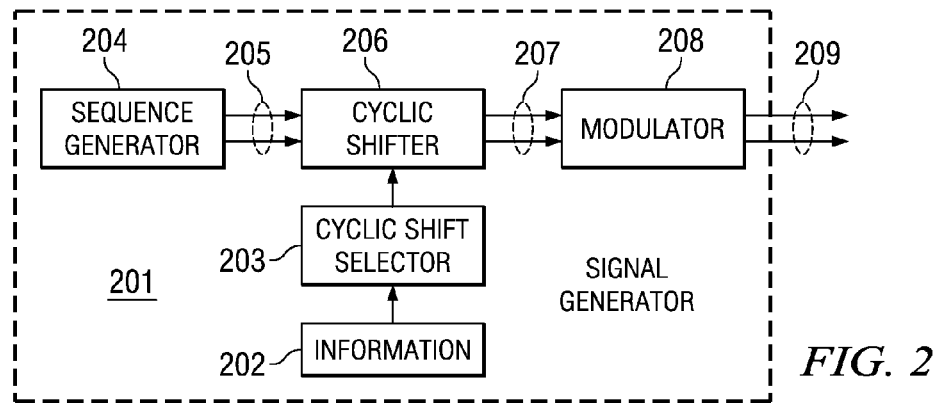
FIG. 2 shows one embodiment of the signal generator.

One embodiment of the constituent CSK transmitter diagram is shown in FIG. 2. A Reference sequence 205 is generated first using the Sequence Generator 204. Embodiments of the Reference Sequence will be discussed later. Information 202 is generated. Information 202 is used to select the value of the cyclic shift, using the cyclic shift selector 203. In addition to the Information 202, the cyclic shift selector 203 operations may depend on other parameters, such as frame number, sub-frame offset, slot offset, NodeB identifier (NodeB ID), cell-group ID, and/or UE ID, and others. Cyclic Shifter 206 performs cyclic shifting of the Reference Sequence 205, to create cyclic shifted signal 207. Constituent Modulator 208 subsequently adapts the signal 207 for further transmission and outputs signal 209. Embodiments of the constituent Modulator will be discussed later.

Figure 3:
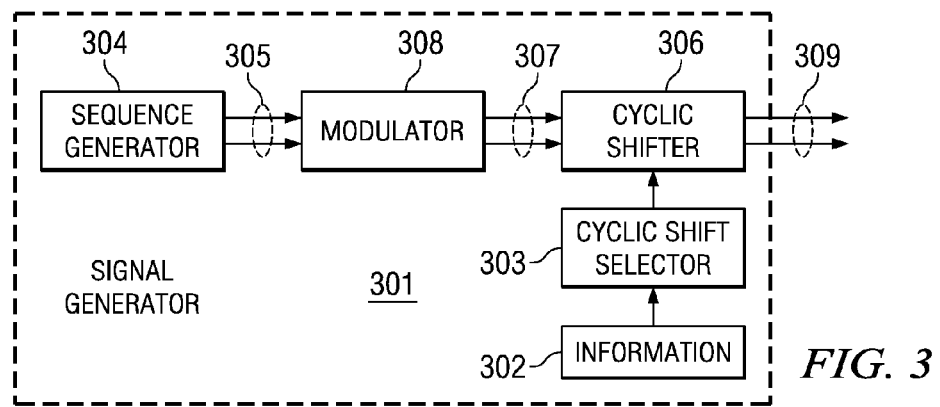
FIG. 3 shows another embodiment of the signal generator.

Another embodiment of the constituent CSK transmitter is shown in FIG. 3. A reference sequence 305 is generated in Sequence Generator 304. Embodiments of the Reference Sequence will be discussed later. The reference Sequence is then modulated using Modulator 308, and a pre-defined base signal 307 is generated. Embodiments of the constituent Modulator will be discussed later. Information 302 is generated. Information 302 is used to select the value of the cyclic shift, using the cyclic shift selector 303. In addition to the Information 302, the cyclic shift selector 303 operations may depend on other parameters, such as frame number, sub-frame offset, slot offset, NodeB identifier (NodeB ID), cell-group ID, and/or UE ID, and others. Cyclic Shifter 306 performs cyclic shifting of the pre-defined base signal 307, to create cyclic shifted signal 309, which is then transmitted over the air.

While example Signal Generators 201 and 301 are illustrated in FIGS. 2 and 3, the Signal Generators 201 and 301 may be implemented using any number and/or type(s) of alternative and/or additional processors, devices, components, circuits, modules, interfaces, etc. Further, one or more of the processors, devices, components, circuits, modules, elements, interfaces, etc. illustrated in FIGS. 2 and/or 3 may be combined, re-arranged, eliminated and/or implemented in any other way. For example, the example sequence generator 204 may be omitted and replaced and/or implemented by a memory and/or memory device storing pre-computed and/or pre-loaded reference signals. Moreover, the example cyclic shift selectors 203 and 303, the example Sequence Generator 204 and 304, the example cyclic shifter 206 and 306, the example Modulators 208 and 308 and/or, more generally, the example RS generators 201 and 301 may be implemented as any combination of firmware, software, logic and/or hardware. Moreover, the example RS generators 201 and 301 may include processors, devices, components, circuits, interfaces and/or modules instead of, or in addition to, those illustrated in FIGS. 2 and/or 3, and/or may include more than one of any or all of the illustrated processors, devices, components, circuits, interfaces and/or modules.

Information 202 or 203 can comprise of one or more bits. The amount of information is determined by the number of allowed values for the cyclic shift. For example, if the number of allowed values for the cyclic shift is N, the Information can contain at most log(N) bits, where log is taken with the base 2. Information can be mapped onto the value of the cyclic shift in any manner. For example, in case that Information is only 1 bit, there are only two allowed values for the cyclic shift. Mapping can be as follows. In case that this Information bit is 0, no cyclic shift is applied. In case that Information bit is 1, cyclic shift is applied, where the amount of the cyclic shift is a half of the signal length. For any signal $\{x(0), x(1), x(2), \ldots, x(L)\}$, the cyclically shifted signal is $\{x(k), x(k+1), \ldots, x(L), x(0), x(1), \ldots, x(k-1)\}$, where "k" is the amount of cyclic shift. Note that cyclic shifting in the other direction is also possible.

Figure 4:
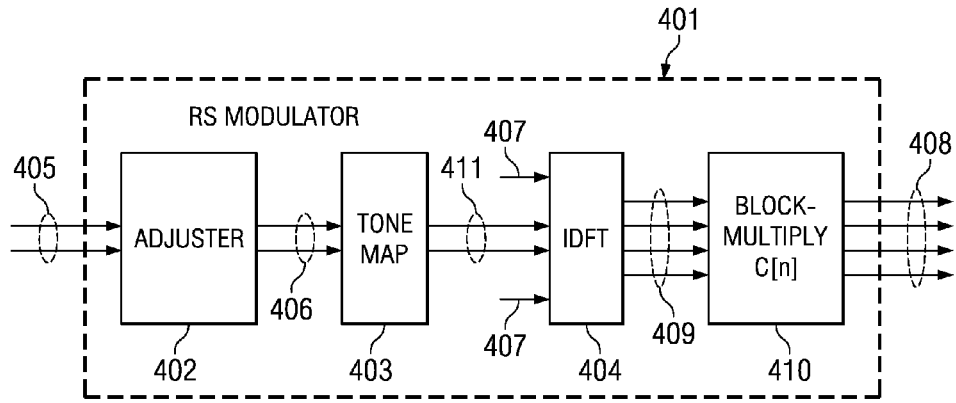
FIG. 4 is a block diagram illustrating an OFDM(A) modulator.

One embodiment of a constituent Modulator 401 is shown in FIG. 4. Adjuster 402 makes adjustments to the length of the input signal 405. In some embodiments, Adjuster 402 is a simple pass-through which can be omitted. In other embodiments, Adjuster 402 truncates some elements of the input signal. In other embodiments, the Adjuster replicates some elements of the input signal. Other operations of the Adjuster are also possible, to produce an adjusted signal 406. Tone Map 403 maps the output of the adjuster onto a set of signals 411 that are input to the inverse discrete Fourier transform (IDFT) 404. Other signals or zeros may be present in 407. Resultant signal (output of IDFT) 409 can then be multiplied using multiplier 410 by a complex number c[n], which depends on the OFDM symbol which is being generated. One purpose of this number can be to separate UEs in the code-domain, where different UEs have different c[n], but the number c[n] can have different purposes. Resultant signal 408 is transmitted over-the-air.

Figure 5:
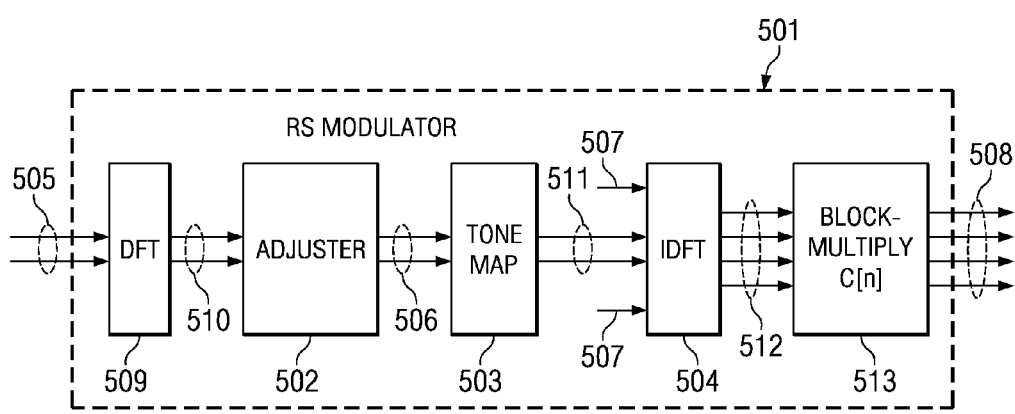
FIG. 5 is a block diagram illustrating a DFT-spread OFDM(A) modulator.

Another embodiment of a constituent Modulator 501 is shown in FIG. 5. The constituent Modulator in FIG. 5 is similar to the one in FIG. 4, with one exception. The input signal 505 in FIG. 5 is pre-processed by the discrete Fourier transform (DFT) 509 to form transformed signal 510. In an alternate example, the operations of the Adjuster 502 and the DFT 509 can be interchanged, i.e. Input Samples 505 are first adjusted with 502 and then the DFT 509 is applied. The DFT and/or IDFT may be implemented using one or more Fast Fourier Transform (FFT) algorithms, or using IFFT algorithms. Similarly to modulator 401, Tone Map 503 maps output 506 of the adjuster onto a set of signals 511 that are input to the inverse discrete Fourier transform (IDFT) 504. Other signals or zeros may be present in 507. Resultant signal (output of IDFT) 512 can then be multiplied using multiplier 513 by a complex number c[n], which depends on the OFDM symbol which is being generated. One purpose of this number can be to separate UEs in the code-domain, where different UEs have different c[n], but the number c[n] can have different purposes. Resultant signal 508 is transmitted over-the-air.

In order to enable a pre-defined base signal transmission which is flat in the frequency domain, the signal 411, 511 which is mapped onto the IDFT should have constant amplitude (aka constant magnitude). Consequently, the signal 405, 510 should have constant amplitude. In reference to FIG. 3 now, the "Sequence Generator" in 304 generates a sequence which has constant amplitude, where constituent Modulator 401 or 501 is used for the Modulator 308. Thus, the pre-defined base signal 307 has a flat spectrum across a set of tones, which is enabled by OFDMA modulation of the constant magnitude sequence.

It is furthermore desirable for the pre-defined base signal to have a low peak-to-average power ratio (PAPR), in the time-domain. This PAPR can be evaluated statistically, or it can be found implicitly through alternate metrics, such as the "cubic metric" (CM). For example, signals which have a low PAPR are typically signals which have a low CM. Thus, special considerations should be made to ensure that the signal has a low PAPR. In wireless systems, this increases the cell-coverage. This is where CAZAC or near-CAZAC Reference Sequences can be used, because they can provide a time-domain transmission with low PAPR. Note that, in reference to FIG. 3, the time domain transmission will be either 307 or its cyclically shifted version 309 if the Cyclic-Shift Selector selects a non-zero value.

CAZAC sequences are complex-valued sequences with the following properties: 1) constant amplitude (CA), and 2) zero cyclic autocorrelation (ZAC). Examples of CAZAC sequences include (but are not limited to): Chu Sequences, Frank-Zadoff Sequences, Zadoff-Chu (ZC) Sequences, and Generalized Chirp-Like (GCL) Sequences.

Zadoff-Chu (ZC) sequences are defined by:

$$a_m(k)=\exp[j2\pi(m/N)[k(k+1)/2+qk]] \text{ for } N \text{ odd}$$

$$a_m(k)=\exp[j2\pi(m/N)[k^2/2+qk]] \text{ for } N \text{ even}$$

An alternative convention of the ZC definition replaces "j" (complex unit) in the above formulas by "−j." Either convention can be adopted. For the representative CAZAC example, the formula was cited on page 53 from K. Fazel and S. Keiser, "Multi Carrier and Spread Spectrum Systems," John Wiley and Sons, 2003. In the above formula, "m" and "N" are relatively prime, and "q" is any fixed integer. For example, q=0 is a good choice, because it simplifies computation as qk=0. Also, "N" is the length of the sequence, "k" is the index of the sequence element (k is from $\{0, 1, \ldots, N-1\}$), and "m" is the index of the root ZC sequence. Making "N" a prime number maximizes the set of root ZC sequences having optimal cross-correlation. Thus, when "N" is prime, there are "(N−1)" possible choices for "m," where each choice results in a distinct root ZC CAZAC sequence. The terms: Zadoff-Chu, ZC, and ZC CAZAC, are commonly used interchangeably. The term CAZAC denotes any CAZAC sequence, like ZC, or otherwise.

It is important to note that, while some embodiments of the invention use strictly CAZAC sequences (generated by Sequence Generator), this is not mandatory. Rather, as described earlier, signals (or sequences) which are mapped onto the tones (through the Tone Map) should be constant in magnitude, which is the first desired property. Furthermore, the resultant time-domain transmission (output of IDFT) should have low peak-to-average power ratio (PAPR), which is the second desired property. The low PAPR is the one which is less or comparable to the PAPR of the classic single-carrier QPSK transmission. Sequences which satisfy the two desired properties are said have a CAZAC-like property, and will be designated as CAZAC-like sequences. Strict CAZAC sequences can also be regarded as CAZAC-like sequences. Thus, a CAZAC-like sequence is a sequence which produces a constant amplitude transmission in the frequency domain, and low PAPR transmission in the time-domain. Frequency-domain transmission should be flat, and the resultant time-domain transmission should have a low PAPR, which can be measured either in terms of 99% peak-power, or alternatively, in terms of "cubic metric," or other metrics.

Embodiments of the present invention convey the ACK/NACK Information using cyclic-shift keying by transmitting a modulated and cyclic-shifted (depending on the ACK/NACK information) CAZAC-like sequence. The ACK/NACK Information bits can be decoded by the amount of the cyclic shift. Furthermore, the CAZAC-like sequence can be used as a reference signal for coherent demodulation of the other uplink control information. This other uplink control information can be, for example, channel quality indicator (CQI), if there is any. Thus, the present method can reduce the uplink control overhead by embedding the ACK/NACK control bits in the uplink reference signal (for the ACK/NACK and/or CQI).

Figure 6:
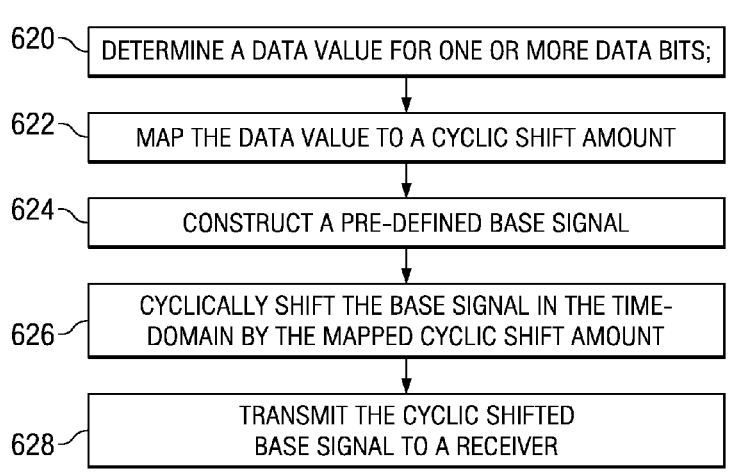
FIG. 6 is a flow chart illustrating cyclic-shift keying.

FIG. 6 is a flow chart illustrating cyclic-shift keying, which is used for transmitting an ACK/NACK response (i.e. logic 710 in FIG. 7). As discussed above, cyclic-shift keying can be used for transmitting a variety of types of data. A data value is determined 620 and then mapped 622 to a cyclic shift amount. Both the transmitter and the receiver are aware of the mapping scheme.

A pre-defined base signal is constructed (624) using orthogonal frequency-division multiplexing (OFDM) modulation, where OFDM modulation comprises mapping a constant amplitude sequence onto a set of tones. As described above, the pre-defined base signal is generally constructed from a CAZAC-like sequence, although various embodiments may use different pre-defined base signals.

The pre-defined base signal is then cyclic shifted 626 in the time-domain by the mapped cyclic shift amount representative of the data value to form a cyclic shifted pre-defined base signal. At step 628, the cyclic shifted pre-defined base signal is then transmitted to a receiver. The receiver can determine the data value by determining the shift amount, since both the transmitter and the receiver are aware of the cyclic shift mapping scheme.

FIG. 7 is a flow chart illustrating formation of a sub-frame that uses embedded ACK/NACK bits within a reference signal. A subframe 704 is formed by a plurality of symbols in which certain ones of the symbols are designated as references signal (RS) symbols. A determination 706 is then made of whether an ACK/NACK is expected by the receiver. If an ACK is not expected 706, then an RS is inserted 708 in the designated RS symbols. If an ACK/NACK is expected 706 due to having received a downlink transport block, for example, then a corresponding ACK/NACK response is formed and embedded 710 in one or more of the symbols designated as RS symbols. The subframe is then transmitted 712 to the receiver and the next subframe is formed 704.

In some embodiments, the reference signal is generated from a base CAZAC-like sequence, as described above. In some embodiments, ACK/NACK value can be embedded (710) in the reference signal by determining a data value for the ACK/NACK response, mapping the data value to a cyclic shift amount, and cyclic shifting the pre-defined base signal by the mapped cyclic shift amount representative of the data value to form a cyclic shifted pre-defined base signal, as described in more detail above.

FIG. 8 shows an exemplary slot structure used to transmit uplink control information. The slot comprises seven OFDM symbols $\{S1, S2, \ldots S7\}$ and corresponding cyclic prefixes (CP). A reference signal is positioned in S2 and S6. In one embodiment of the invention, the ACK/NACK feedback is embedded in the position of the reference signal. In the exemplary slot structure, this is in S2 and S6. Thus, if the ACK/NACK feedback is not transmitted, and is not expected by the receiver, the reference signal is transmitted in S2 and S6. If ACKNAK feedback is transmitted, it is embedded in S2 or S6, or both.

In some embodiments the reference signal in S2 and S6 is generated as the pre-defined base signal above. This reference signal is used for coherent demodulation of the data in S1, S3, S4, S5, and S7. In case that the ACK/NACK is transmitted, then the ACK/NACK is transmitted by embedding it in the reference signal. For example, this embedding can be simply achieved by cyclically shifting the reference signal (which is also the pre-defined base signal in this case), in accordance with the ACK/NACK information.

FIG. 9 shows another embodiment of the timing structure for ACKNAK transmission. In FIG. 9, each block, such as representative block 902, represents one OFDM symbol, with the plotted time-frequency occupancy. The transmission of cyclic prefix 904 (or, at times, simple guard time) before each OFDM symbol is optional. Different blocks are not necessarily of the same size, in time, or in frequency. Each block can be configured to be used either for ACK/NACK transmission, CQI transmission, data transmission, or transmission of other control information. This reconfiguration can be done depending on the need for ACK/NACK and CQI transmission, and the need for data transmission. A UE may be configured to use one or more blocks for transmission of a single ACK/NACK. An example of one configuration is given in FIG. 9, which shows blocks assigned for ACK/NACK transmission of 4 UEs, UE1-UE4. In the embodiment in FIG. 9, some UEs use "frequency hoping" to transmit their ACK-NAK information (UE 2 is shown as such).

Referring again to FIG. 4 and/or FIG. 5, the number of used sub-carriers is only exemplary, and in practice more or less sub-carriers can be used. The used sub-carriers selected by the Tone Map logic 403 and/or 503 match the allocated frequency blocks for ACK/NACK transmission. A reference sequence is pre-determined. Finally, the value of the cyclic shift performed by Cyclic Shift Selector logic 203 and/or 303 in FIG. 2 and/or FIG. 3 is ACK/NACK information-bearing. For example, no cyclic shift can represent ACK, and a cyclic shift by a half of the sequence length can represent a NACK. However, other one-to-one mappings are not precluded, even when multiple ACK/NACK bits are to be transmitted within a block. Multiple bits are mapped to different values of the Cyclic Shift.

Notice that multiple time-frequency resource blocks, in some embodiments, can be assigned to convey more ACK/NACK bits or to improve the probability of successful reception of the ACK/NACK bits. Multiple antennas can also be employed to improve the performance by exploiting the spatial diversity.

When multiple time-frequency resources are used for ACK/NACK transmission, the mapping of Cyclic Shift to ACK/NACK information may or may not be different for each time-frequency resource. As a simplest example, when two different OFDM symbols, or two different OFDM slots, are used to transmit ACK/NACK, then the value of Cyclic Shift used in their transmission may be the same for ACK/NACK repetition.

Mapping between ACK/NACK information and the value of cyclic shift is agreed, or in other words pre-determined, between the transmitter and the receiver, and this mapping may vary across time and/or frequency, and between different mobiles. In some embodiments, the time-frequency resources for ACK/NACK transmission may be configured depending on the need. For example, cell interior users may use only one or two OFDM symbols (or one or more slots) for ACK/NACK transmission, whereas cell-edge users may require more OFDM symbols (or one or more slots) for ACK/NACK transmission. Thus, in some embodiments, resources for ACK/NACK transmission can be assigned based on UE geometry, and are not necessarily the same for all UEs.

When ACK/NACK is embedded in the reference signal, it can also serve as a reference signal for coherent demodulation, after ACK/NACK is decoded. For example, if there is any CQI for transmission, the ACK/NACK information-bearing pre-defined base signal can serve as the reference signal for coherent demodulation of CQI of the same UE. If there is no ACK/NACK, but CQI, the conventional reference signal plus CQI structure can be used for coherent demodulation of the CQI. In case there is neither ACK/NACK nor CQI, the resource block can be assigned to a UE who has uplink data transmission.

Figure 10:
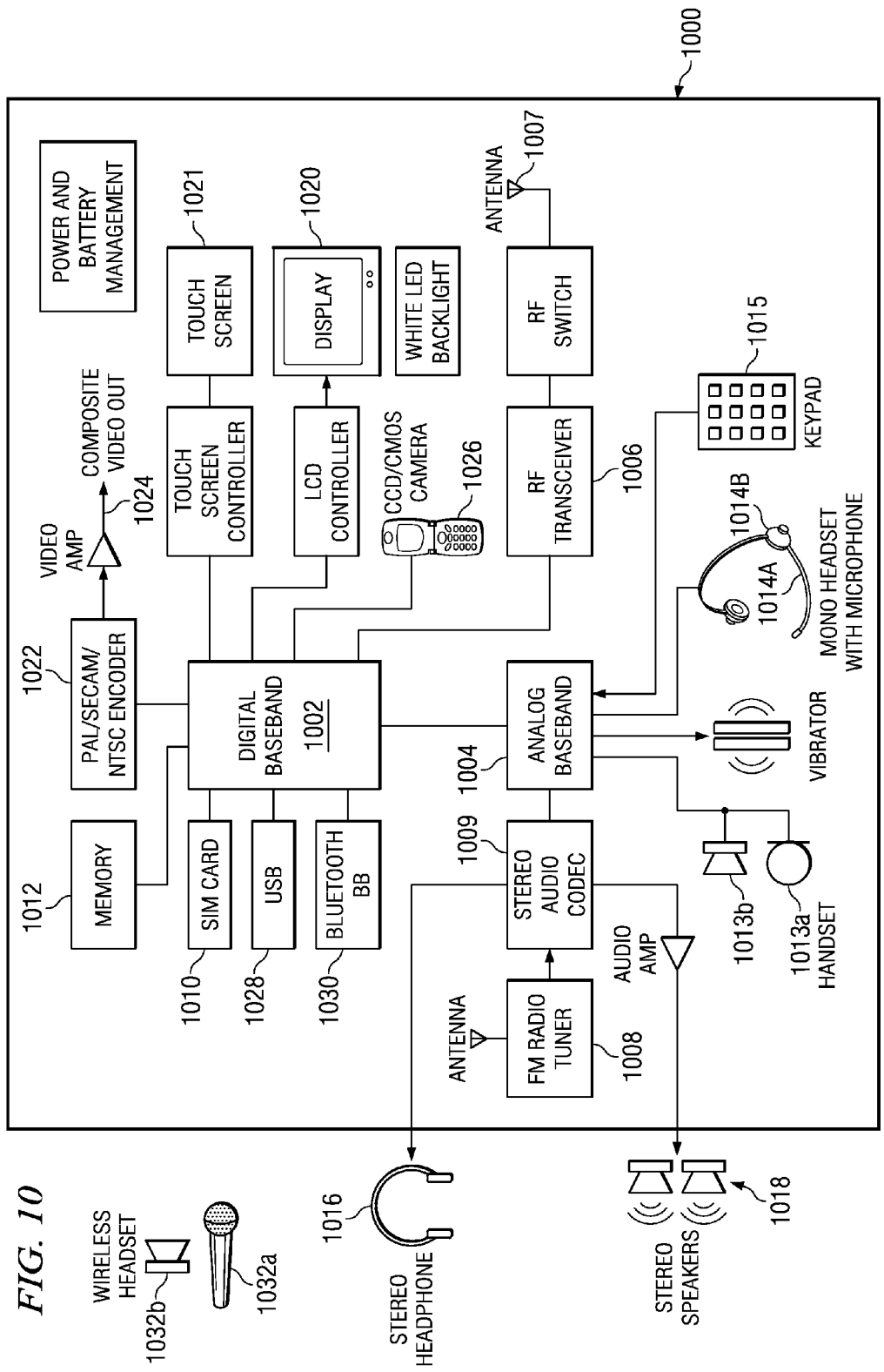
FIG. 10 is a block diagram illustrating a mobile device that uses embedded ACK/NACK bits within the reference signal.

FIG. 10 is a block diagram of a UE 1000 that uses cyclic-shift keying transmission of ACK/NACK responses in RS symbols, as described above. Data maybe entered utilizing a keypad 1015 or via a touch screen 1021, which may also display and may utilize a touch screen controller. Digital system 1000 is a representative cell phone that is used by a mobile user. Digital baseband (DBB) unit 1002 is a digital processing processor system that includes embedded memory and security features. In this embodiment, DBB 1002 is a media processor designed for multimedia applications. Such processors may contain a dual-core architecture consisting of both a general-purpose host processor and one or more DSP (digital signal processor).

Analog baseband (ABB) unit 1004 performs processing on audio data received from stereo audio codec (coder/decoder) 1009. Audio codec 1009 receives an audio stream from FM Radio tuner 1008 and sends an audio stream to stereo headset 1016 and/or stereo speakers 1018. In other embodiments, there may be other sources of an audio stream, such a compact disc (CD) player, a solid state memory module, etc. ABB 1004 receives a voice data stream from handset microphone 1013a and sends a voice data stream to handset mono speaker 1013b. ABB 1004 also receives a voice data stream from microphone 1014A and sends a voice data stream to mono headset 1014B. Usually, ABB and DBB are separate ICs. In most embodiments, ABB does not embed a programmable processor core, but performs processing based on configuration of audio paths, filters, gains, etc being setup by software running on the DBB. In an alternate embodiment, ABB processing is performed on the same OMAP processor that performs DBB processing. In another embodiment, a separate DSP or other type of processor performs ABB processing.

RF transceiver 1006 includes a receiver for receiving a stream of coded data frames from a cellular base station via antenna 1007 and a transmitter for transmitting a stream of coded data frames to the cellular base station via antenna 1007. A reference signal is transmitted and configuration commands can be received from the serving base station. When an ACK/NACK response is expected, it is embedded in the reference signal. In some embodiments, this embedding is achieved by cyclic-shifting, according to a 1-1 mapping of the ACK/NACK data value, as described in more detail above. Among the configuration commands can be a command (implicit or explicit) to use a particular sub-channel for transmission that has been selected by the serving NodeB. Transmission of the scheduled resource blocks are performed by the transceiver using the sub-channel designated by the serving NodeB. Frequency hopping may be implied by using two or more sub-channels as commanded by the serving NodeB. In this embodiment, a single transceiver supports OFDMA and SC-FDMA operation but other embodiments may use multiple transceivers for different transmission standards. Other embodiments may have transceivers for a later developed transmission standard with appropriate configuration. RF transceiver 1006 is connected to DBB 1002 which provides processing of the frames of encoded data being received and transmitted by cell phone 1000.

The basic SC-FDMA DSP radio can include DFT, subcarrier mapping, and IFFT (fast implementation of IDFT) to form a data stream for transmission and DFT, subcarrier de-mapping and IFFT to recover a data stream from a received signal. DFT, IFFT and subcarrier mapping/de-mapping may be performed by instructions stored in memory 1012 and executed by DBB 1002 in response to signals received by transceiver 1006.

DBB unit 1002 may send or receive data to various devices connected to USB (universal serial bus) port 1028. DBB 1002 is connected to SIM (subscriber identity module) card 1010 and stores and retrieves information used for making calls via the cellular system. DBB 1002 is also connected to memory 1012 that augments the onboard memory and is used for various processing needs. DBB 1002 is connected to Bluetooth baseband unit 1030 for wireless connection to a microphone 1032*a* and headset 1032*b* for sending and receiving voice data.

DBB 1002 is also connected to display 1020 and sends information to it for interaction with a user of cell phone 1000 during a call process. Display 1020 may also display pictures received from the cellular network, from a local camera 1026, or from other sources such as USB 1028.

DBB 1002 may also send a video stream to display 1020 that is received from various sources such as the cellular network via RF transceiver 1006 or camera 1026. DBB 1002 may also send a video stream to an external video display unit via encoder 1022 over composite output terminal 1024. Encoder 1022 provides encoding according to PAL/SECAM/NTSC video standards.

Figure 11:
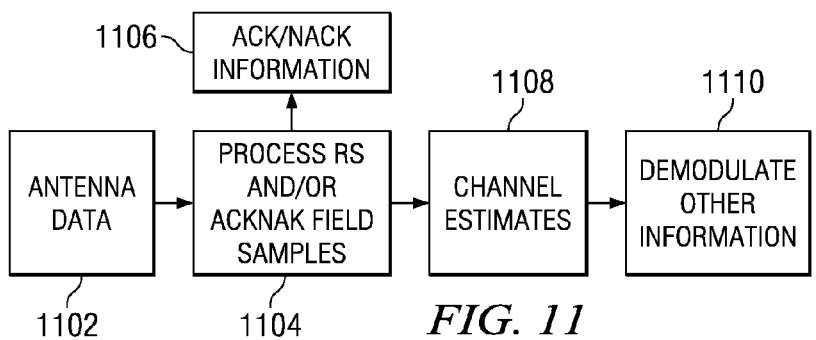
FIG. 11 shows an example of the data flow of a receiver.

FIG. 11 shows an example of the data flow of a receiver. Logic block 1104 processes the received antenna data 1102 to retrieve channel estimates 1108 and the ACK/NACK information bits 1106, if there are any. More specifically, the logic block 1104 processes those received data samples which are obtained for the duration of the reference signal. Turning to FIG. 8, these would be S2 and S6. The obtained channel estimation is subsequently used to coherently demodulate other information 1110, such as other control signaling or data.

Figure 12:
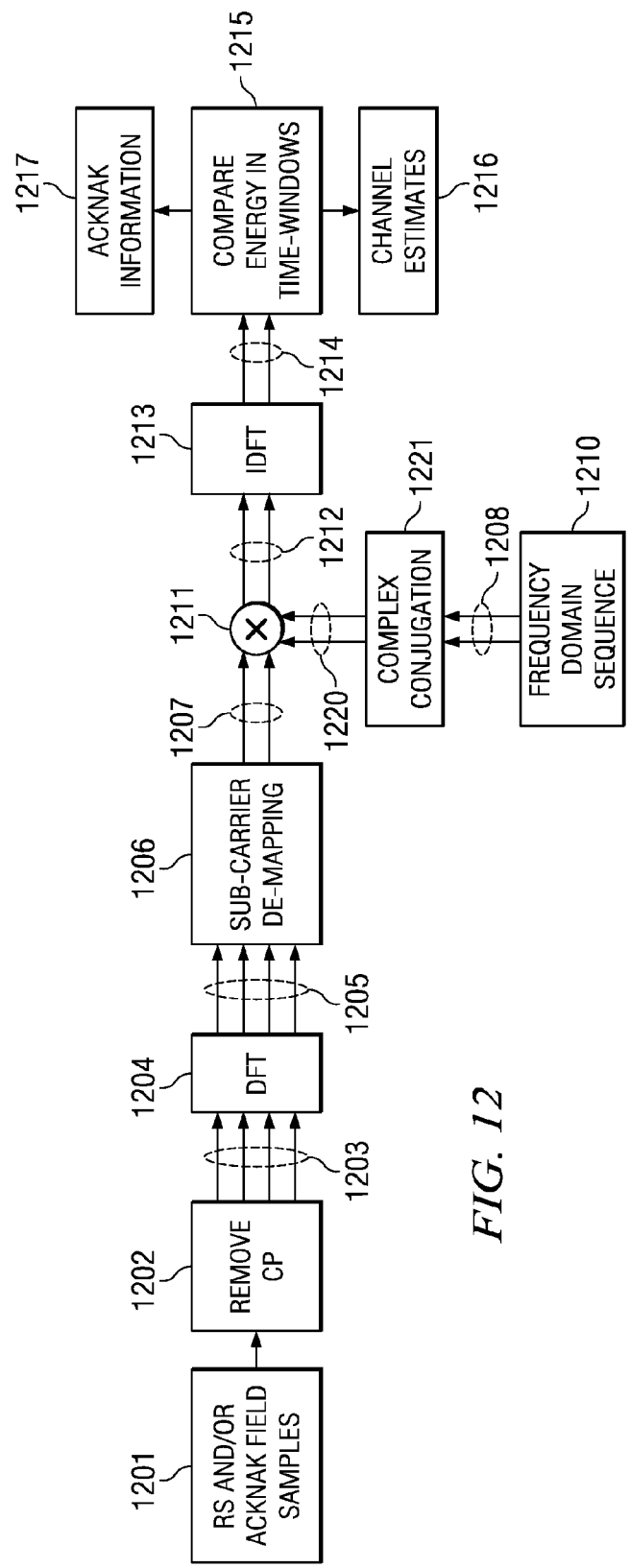
FIG. 12 is a block diagram illustrating a receiver for use in the cellular network of FIG. 1.

FIG. 12 shows an embodiment of a signal receiver for use in the cellular network of FIG. 1. Embodiments of this receiver may be used in NodeB N1, N2 of FIG. 1, or in cell phone 1000, for example. This receiver advantageously makes use of the time and frequency domain transforming components used to map and de-map data blocks in the uplink sub-frame. The received reference signal and/or the cyclic shifted reference signal (i.e. the ACK/NACK information bearing reference signal) 1201 is input to cyclic prefix removal component 1202 which strips cyclic prefix producing signal 1203. Frequency domain transforming component DFT 1204 couples to cyclic prefix removal component 1202. Frequency domain transforming component 1204 converts signal 1203 into sub-carrier mapped frequency tones 1205. Sub-carrier (aka Tone) de-mapping component 1206 is coupled to frequency domain transforming component 1204. Sub-carrier de-mapping component 1206 de-maps sub-carrier mapped frequency tones 1205 to produce useful frequency tones 1207. The frequency domain sequence 1210 refers to the base (not cyclic shifted) CAZAC-like sequence represented in the frequency domain. Complex conjugation to signal 1208 is performed using 1221, to produce samples 1220. Product component 1211 computes a tone by tone complex multiplication of received frequency tones 1207 with samples 1220 to produce a set of frequency tones 1212. Time domain transforming component (IDFT) 1213 is coupled to product component 1211. Time domain transforming component 1213 converts multiplied frequency tones 1212 into signal 1214, which contains a cyclic shifted channel response. Energy detection block 1215 is coupled to time domain transforming block 1213. An example of the energy detection block 1215 is illustrated later in FIG. 13. Based on the results of the energy detection, an amount of cyclic-shift is determined and then used to determine a value for an ACK/NACK info block 1217, according to the predetermined mapping between the cyclic shifts and the ACK/NACK information bits. Channel estimate info 1216 is also derived from the same sequence 1214 that contains the ACK/NACK bits. Terms "sub-carrier" and "tone" can be used interchangeably.

Figure 13:
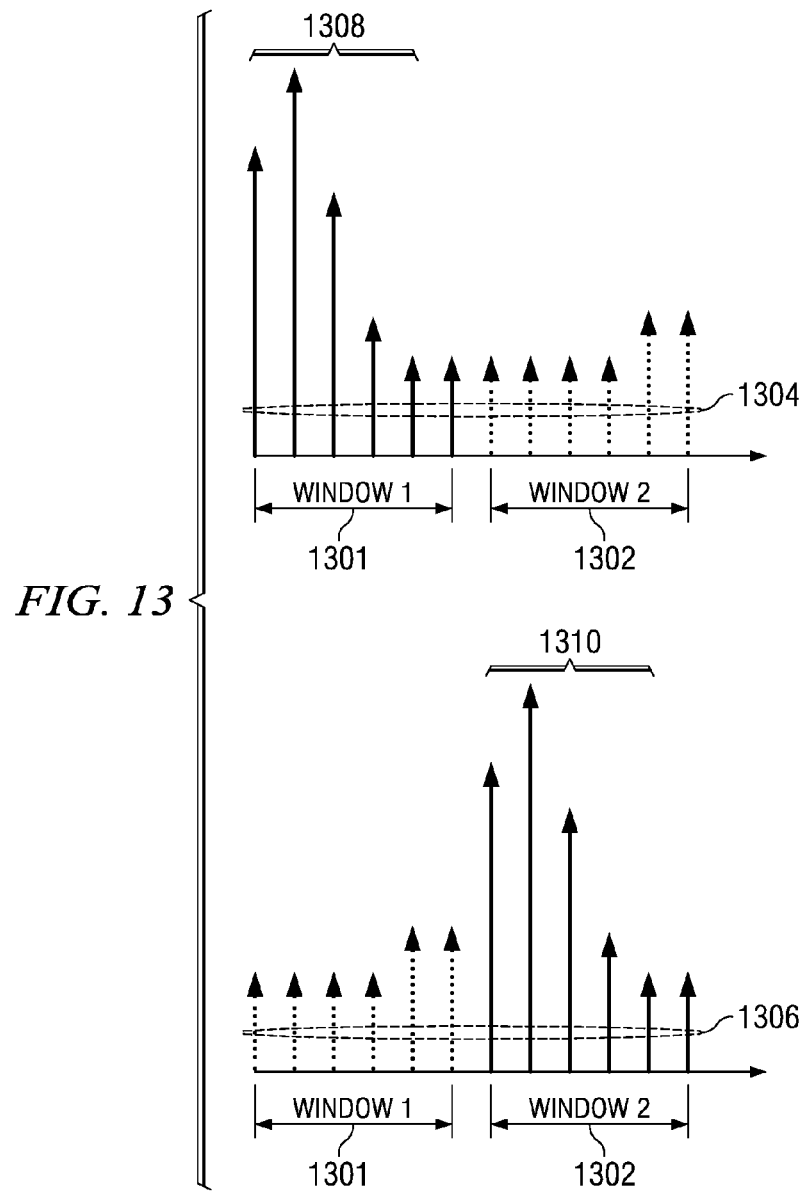
FIG. 13 illustrating an example of determining the ACK/NACK information bits, as well as deriving the channel estimation.

FIG. 13 shows details of an example of energy detection logic 1215 in FIG. 12. Let L denote the maximum length of the channel response (i.e. signal 1214 in FIG. 12), which is divided into N sections (corresponding to detection regions for different cyclic shift amounts of the base CAZAC sequence). The ACK/NACK bits are 1-1 mapped to the N sections. Thus, $\log_2 N$ ACK/NACK bits can be transmitted within a time-frequency resource block. Referring still to FIG. 13, there is shown an example in which L=12 and N=2 (1 bit ACK/NACK). Two window sections 1301 and 1302 each of length six are thereby formed. The 1 bit ACK/NACK can be represented by the base CAZAC-like sequence 1304 and a cyclic shifted CAZAC-like sequence 1306 with the shift amount of six. Note that signal 1304 or signal 1306 is candidate for signal 1214 in FIG. 12. The energy detection block 1215 in FIG. 12 compares the sum energy in window 1301 and 1302 to determine either the base CAZAC-like signal 1304 or the cyclic shifted CAZAC-like signal 1306 is transmitted, which can be subsequently used to determined the ACK/NACK information bit according to the 1-1 mapping between the ACK/NACK bits and sections (i.e. cyclic shifts). Alternatively, the energy detection logic 1215 in FIG. 12 may locate the window in which the strongest channel response tap resides, to determine either the base or the cyclic shifted CAZAC-like sequence is transmitted. Other ACK/NACK decoding methods are not precluded for other embodiments. Moreover, after determining the window containing the ACK/NACK bit, the channel estimation can also be derived from the signal 1214 in FIG. 12 in the corresponding window. For example, at 1308, the maximum sum energy is in window 1, which means it can be Inferred that: sequence was transmitted with no cyclic shifts, and time-domain channel estimates are in window 1. Likewise, at 1310 the maximum sum energy is in window 2, which means it can be Inferred that: a cyclic shifted sequence was transmitted, and time-domain channel estimates are in window 2.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. This invention applies in uplink and downlink.

Embodiments of this invention apply to any flavor of frequency division multiplex based transmission. Thus, the concept of valid specification of sub-channels can easily be applied to: OFDMA, OFDM, DFT-spread OFDM, DFT-spread OFDMA, SC-OFDM, SC-OFDMA, MC-CDMA, and all other FDM-based transmission strategies.

A Node B is generally a fixed station and may also be called a base transceiver system (BTS), an access point, or some other terminology. A UE, also commonly referred to as terminal or mobile station, may be fixed or mobile and may be a wireless device, a cellular phone, a personal digital assistant (PDA), a wireless modem card, and so on.

It is therefore contemplated that the appended claims will cover any such modifications of the embodiments as fall within the true scope and spirit of the invention.

What is claimed is:

1. A method for transmitting in a wireless cellular network, comprising:
    determining a data value for an ACK/NACK status information;
    mapping the data value for the ACK/NACK status information to a cyclic shift amount of a reference signal, wherein the ACK/NACK status information is embedded in the reference signal;
    constructing a pre-defined base signal using orthogonal frequency-division multiplexing (OFDM) modulation, where OFDM modulation comprises mapping a constant amplitude sequence onto a set of tones;
    cyclically shifting the base signal in the time-domain by the mapped cyclic shift amount representative of the data value to form a cyclic shifted base signal; and
    transmitting the cyclic shifted base signal to a receiver, whereby the receiver can determine the data value by determining the shift amount, wherein the cyclic shifts are different cyclic shift of constant amplitude zero cyclic auto-correction (CAZAC) sequence with zero auto-correlation properties providing orthogonal transmissions.

2. The method of claim 1, further comprising transmitting a channel quality indicator (CQI) in conjunction with a cyclic shifted constant amplitude zero cyclic auto-correlation (CAZAC) like sequence, whereby the receiver may use the cyclic shifted CAZAC-like sequence as a reference signal for coherent demodulation of the CQI.

3. The method of claim 1, further comprising modifying a constant amplitude zero cyclic auto-correction (CAZAC) like sequence before cyclic shifting.

4. The method of claim 1, wherein the data value is an acknowledge (ACK/NACK) status bit.

5. The method of claim 1, wherein the same data value is re-transmitted a second or more times for redundancy.

6. The method of claim 5, wherein the data value is mapped to a different cyclic shift amount that is used for the second re-transmission.

7. The method of claim 2, further comprising:
    receiving a signal at the receiver that includes the transmitted cyclic shifted constant amplitude zero cyclic auto-correlation (CAZAC) like sequence;
    determining the shift amount of the transmitted cyclic shifted CAZAC-like sequence; and
    extracting the data value in accordance with the shift amount.

8. The method of claim 7, wherein determining the shift amount comprises:
    demodulating the received signal with the based CAZAC-like sequence to obtain the estimated channel taps; and
    estimating the shift amount based on a location of a maximum channel tap.

9. The method of claim 7, wherein determining the shift amount comprises:
    demodulating the received signal with the base CAZAC-like sequence to obtain the estimated channel taps; and
    estimating the shift amount based on a maximum section energy wherein a length of the CAZAC-like sequence is divided into N sections.

10. The method of claim 7, further comprising using the cyclic shifted CAZAC-like sequence as a reference signal for coherent demodulation of the CQI.

11. A method for transmitting in a wireless cellular network, comprising:
    determining a data value for an ACK/NACK status information;
    mapping the data value for the ACK/NACK status information to a cyclic shift amount of a reference signal, wherein the ACK/NACK status information is embedded in the reference signal;
    forming a subframe with a plurality of symbols with certain symbols designated as reference signals (RS) symbols;
    determining when an acknowledge (ACK/NACK) response is expected;
    when ACK/NACK response is not expected, inserting a pre-defined reference signal in the duration of symbols designated as RS symbols;
    when an ACK/NACK response is expected, embedding the ACK/NACK response in one or more of the symbols designated as RS symbols; and
    transmitting the subframe to a receiver, whereby the receiver can determine the ACK/NACK in the RS symbol, when present, and also use the RS symbol for coherent demodulation of a CQI (channel quality indicator) or data, wherein a cyclic shift is different cyclic shift of constant amplitude zero cyclic auto-correction (CAZAC) sequence with zero auto-correlation properties providing orthogonal transmissions.

12. The method of claim 11 wherein the RS comprises a base constant amplitude zero cyclic auto-correction (CAZAC) like sequence and embedding the acknowledge (ACK/NACK) response comprises:
    determining a data value for the ACK/NACK response;
    mapping the data value to a cyclic shift amount; and
    cyclic shifting the base CAZAC-like sequence by the mapped cyclic shift amount representative of the data value to form a cyclic shifted CAZAC-like sequence.

13. A user equipment (UE) device for use in a wireless cellular network, comprising:
    means for forming a subframe with a plurality of symbols with certain symbols designated as reference signal (RS) symbols;
    means for determining when an acknowledge (ACK/NACK) response is expected;
    means for inserting an RS in the duration of symbols designated as RS symbols when ACK/NACK response is not expected;

means for determining and mapping a data value for the ACK/NACK status information to a cyclic shift amount of a reference signal, wherein the ACK/NACK status information is embedded in the reference signal;

means for embedding the ACK/NACK response in one or more of the symbols designated as RS symbols when an ACK/NACK response is expected; and means for transmitting the subframe to a receiver, whereby the receiver can determine the ACK/NACK in the RS symbol, when present, and also use the RS symbol for coherent demodulation of a CQI (channel quality indicator) or data, wherein cyclic shift are different cyclic shift of constant amplitude zero cyclic auto-correction (CAZAC) sequence with zero auto-correlation properties providing orthogonal transmissions.

14. The UE of claim 13 wherein the RS comprises a base CAZAC-like sequence and wherein the means for embedding the ACK/NACK response comprises:

means for determining a data value for the ACK/NACK response;

means for mapping the data value to a cyclic shift amount; and means for cyclic shifting the base CAZAC-like sequence by the mapped cyclic shift amount representative of the data value to form a cyclic shifted CAZAC-like sequence.

* * * * *